United States Patent
Zonoz et al.

(10) Patent No.: US 10,287,841 B2
(45) Date of Patent: May 14, 2019

(54) PACKER FOR ANNULAR BLOWOUT PREVENTER

(71) Applicant: Cameron International Corporation, Houston, TX (US)

(72) Inventors: Ray Zonoz, Sugar Land, TX (US); Xuming Chen, Katy, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/456,734

(22) Filed: Mar. 13, 2017

(65) Prior Publication Data

US 2018/0258728 A1    Sep. 13, 2018

(51) Int. Cl.

| E21B 33/06 | (2006.01) |
| E21B 33/12 | (2006.01) |
| F04B 15/00 | (2006.01) |
| F04B 47/00 | (2006.01) |
| F16J 15/16 | (2006.01) |
| F16J 15/18 | (2006.01) |
| F16J 15/00 | (2006.01) |

(52) U.S. Cl.
CPC .............. *E21B 33/06* (2013.01); *E21B 33/12* (2013.01); *F04B 15/00* (2013.01); *F04B 47/00* (2013.01); *F16J 15/164* (2013.01); *F16J 15/184* (2013.01); *F16J 15/00* (2013.01)

(58) Field of Classification Search
CPC ........ E21B 33/06; E21B 33/064; E21B 33/08; E21B 33/085; E21B 2033/005; E21B 33/061; E21B 33/12; F16J 15/184
USPC .................................... 251/1.1, 1.2; 277/237
See application file for complete search history.

(56) References Cited

U.S. PATENT DOCUMENTS

| 2,038,140 A * | 4/1936 | Stone ...................... E21B 33/06 |
| | | 277/332 |
| 2,287,205 A * | 6/1942 | Stone ...................... E21B 33/06 |
| | | 137/539.5 |
| 2,812,197 A * | 11/1957 | Gibson ................... E21B 33/06 |
| | | 277/327 |

(Continued)

FOREIGN PATENT DOCUMENTS

WO    2015028790 A2    3/2015

OTHER PUBLICATIONS

Non final office action for the cross referenced U.S. Appl. No. 15/599,886 dated Dec. 29, 2017.

*Primary Examiner* — Robert K Arundale
*Assistant Examiner* — Jonathan J Waddy
(74) *Attorney, Agent, or Firm* — Helene Raybaud

(57) ABSTRACT

An annular blowout preventer includes a housing, an annular packer positioned within the housing, and an annular piston assembly positioned within the housing. An annular contacting surface of the annular piston is configured to contact the annular packer while the annular blowout preventer is in the open position. The annular blowout preventer also includes a plurality of inserts extending axially through the annular packer and arranged circumferentially within the annular packer. The annular piston is configured to drive the annular packer in an axial direction within the housing, thereby compressing the annular packer, causing the plurality of inserts to rotate radially inwardly, and moving the annular blowout preventer from the open position to a closed position.

19 Claims, 8 Drawing Sheets

(56) References Cited

U.S. PATENT DOCUMENTS

| | | | | |
|---|---|---|---|---|
| 2,832,617 A * | 4/1958 | Gibson | | E21B 33/06 277/327 |
| 3,323,773 A * | 6/1967 | Walker | | E21B 33/06 251/1.2 |
| 3,486,759 A | 12/1969 | Lewis | | |
| 3,561,723 A | 2/1971 | Cugini | | |
| 3,887,158 A | 6/1975 | Polk | | |
| 3,897,071 A | 7/1975 | Le Rouax | | |
| 3,994,472 A * | 11/1976 | Williams | | E21B 33/06 251/1.2 |
| 4,095,805 A | 6/1978 | Allen | | |
| 4,099,699 A * | 7/1978 | Allen | | E21B 33/06 251/1.2 |
| 4,283,039 A * | 8/1981 | Schaeper | | E21B 33/06 251/1.2 |
| 4,310,139 A * | 1/1982 | Williams, III | | F16J 15/166 251/1.2 |
| 4,381,868 A * | 5/1983 | Croy | | E21B 33/03 166/88.4 |
| 4,458,876 A * | 7/1984 | Schaeper | | E21B 33/06 251/1.2 |
| 4,460,150 A * | 7/1984 | Turlak | | E21B 33/06 251/1.2 |
| 4,460,151 A * | 7/1984 | Williams, III | | E21B 33/06 251/1.2 |
| 4,508,311 A * | 4/1985 | Just | | E21B 33/06 251/1.2 |
| 4,541,490 A | 9/1985 | Bigbie et al. | | |
| 4,579,314 A | 4/1986 | Schaeper et al. | | |
| 5,361,832 A | 11/1994 | Van Winkle | | |
| 7,159,669 B2 | 1/2007 | Bourgoyne et al. | | |
| 7,240,727 B2 | 7/2007 | Williams | | |
| 8,176,933 B2 | 5/2012 | Huff et al. | | |
| 8,215,613 B2 | 7/2012 | Cheung | | |
| 8,555,980 B1 | 10/2013 | Powell | | |
| 8,727,303 B2 * | 5/2014 | Araujo | | E21B 33/061 166/363 |
| 9,068,433 B2 * | 6/2015 | Bushman | | E21B 41/0007 |
| 9,765,587 B2 * | 9/2017 | Boulanger | | E21B 33/035 |
| 2014/0209316 A1 * | 7/2014 | Tindle | | E21B 33/035 166/345 |
| 2015/0275609 A1 | 10/2015 | Liotta et al. | | |
| 2016/0201422 A1 * | 7/2016 | Averill | | E21B 33/06 166/387 |
| 2016/0230492 A1 * | 8/2016 | Boulanger | | E21B 33/085 |
| 2017/0130575 A1 * | 5/2017 | Jaffrey | | E21B 47/011 |

\* cited by examiner

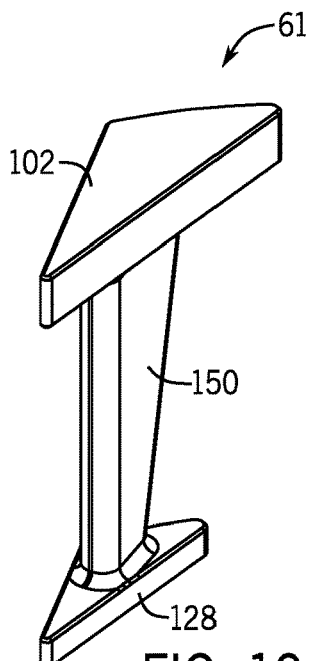 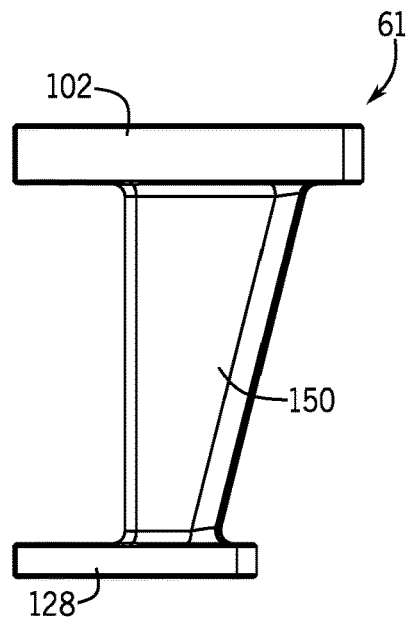
FIG. 10   FIG. 11
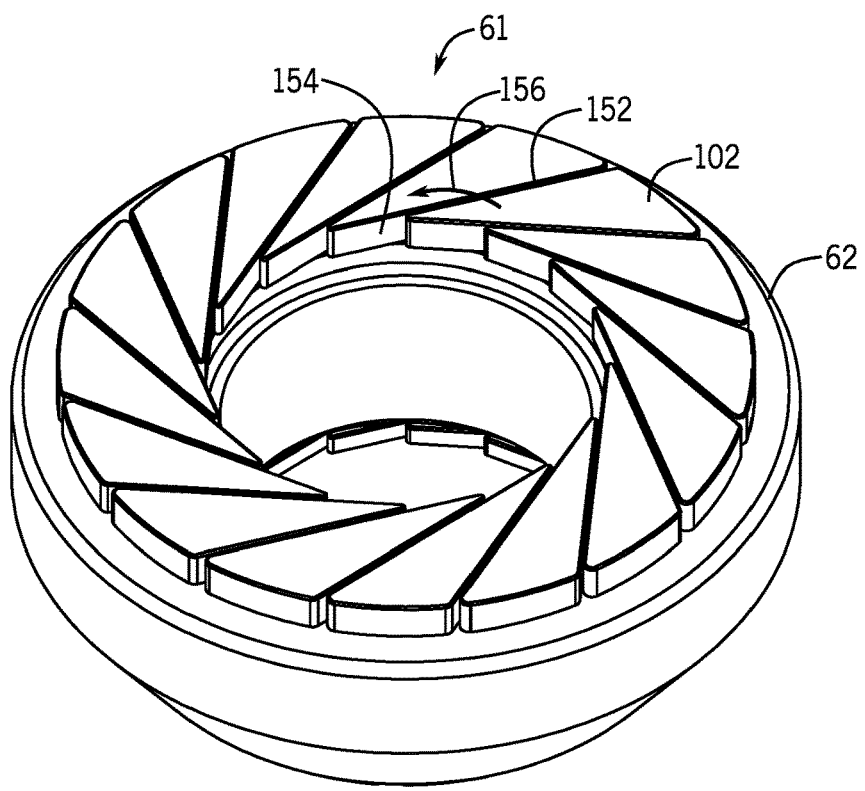
FIG. 12

PACKER FOR ANNULAR BLOWOUT PREVENTER

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An annular blowout preventer (BOP) is installed on a wellhead to seal and control an oil and gas well during drilling operations. A drill string may be suspended inside the oil and gas well from a rig through the annular BOP into the well bore. During drilling operations, a drilling fluid is delivered through the drill string and returned up through an annulus between the drill string and a casing that lines the well bore. In the event of a rapid invasion of formation fluid in the annulus, commonly known as a "kick," the annular BOP may be actuated to seal the annulus and to control fluid pressure in the wellbore, thereby protecting well equipment disposed above the annular BOP. The configuration of the annular BOP, including the geometry of a packer of the annular BOP, can affect the ability of the annular BOP to seal the annulus.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 10 is a perspective view of a rigid insert that may be positioned within a packer of an annular BOP that may be used in the system of FIG. 1;

FIG. 11 is a side view of the rigid insert of FIG. 10; and

FIG. 12 is a perspective view of an embodiment of a packer having a modified geometry and rigid inserts.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to annular blowout preventers (BOPs). Annular BOPs include a piston (e.g., an annular piston) and a packer (e.g., an annular packer) disposed within a housing (e.g., an annular housing). The piston may be adjusted in a first direction to drive the packer from an open position to a closed position to seal an annulus around a drill string disposed through a central bore of the annular BOP or to close the central bore. Certain disclosed embodiments include annular BOPs with an assembly (e.g., a closing assembly) having a relatively large packer (e.g., having a relatively large thickness) and a relatively small donut (e.g., annular support structure, having a relatively small thickness) positioned circumferentially about the packer. The piston directly contacts both the donut and the packer, and thereby drives the packer from the open position to the closed position. Such a configuration may improve crack resistance of the packer and/or the donut, enable the packer to achieve the closed position and/or maintain the seal with a lower pressure applied to the piston, and/or enable the drill string to drift (e.g., radially and/or axially) within the central bore of the annular BOP, for example. Certain disclosed embodiments include annular BOPs with a one-piece assembly (e.g., having a packer and without a donut or other elastomeric structure circumferentially surrounding the packer), which may facilitate drifting of the drill string, reduce the weight of the annular BOP, as well as provide simplified manufacturing, installation, removal, repair, and/or replacement of the assembly within the annular BOP.

Figure 1:
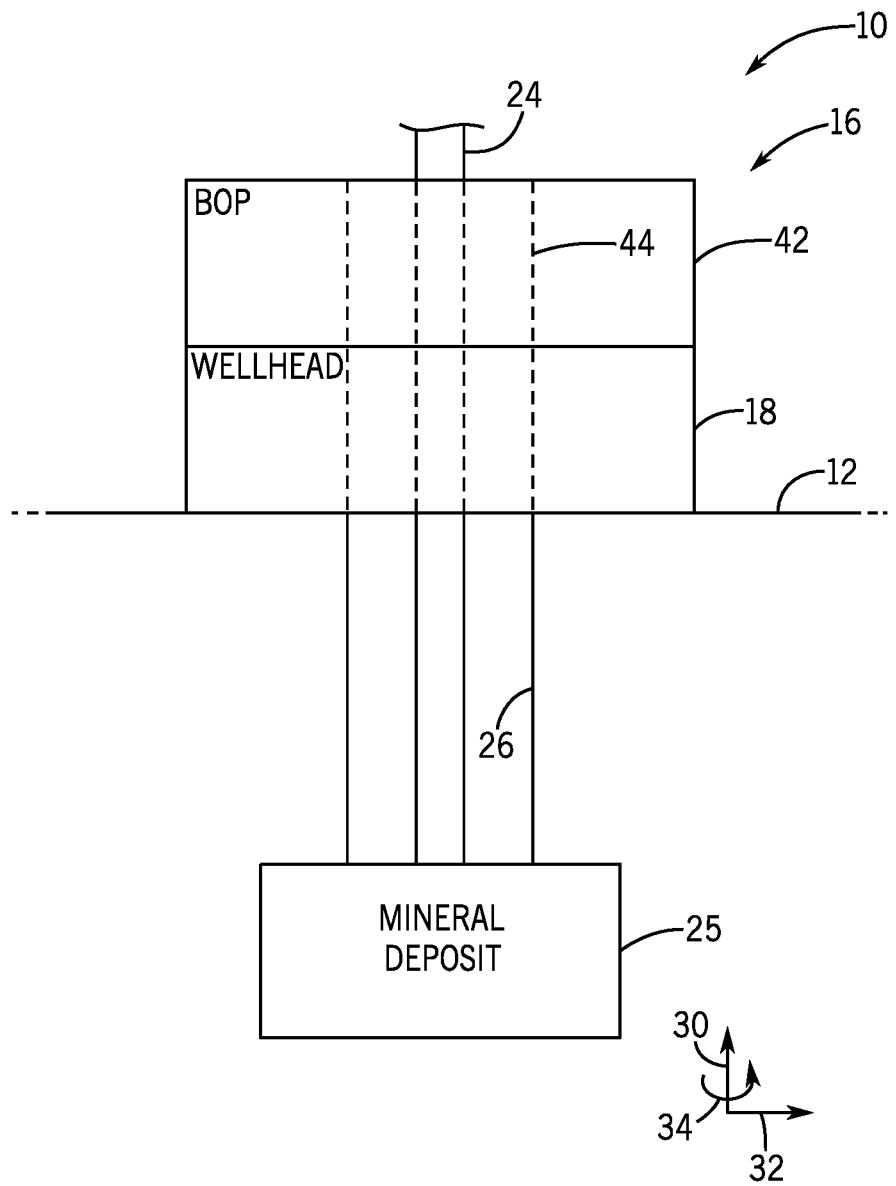
FIG. 1 is a block diagram of a mineral extraction system in accordance with an embodiment of the present disclosure.

With the foregoing in mind, FIG. 1 is a block diagram of an embodiment of a mineral extraction system 10. The illustrated mineral extraction system 10 may be configured to extract various minerals and natural resources, including hydrocarbons (e.g., oil and/or natural gas), from the earth, or to inject substances into the earth. The mineral extraction system 10 may be a land-based system (e.g., a surface system) or an offshore system (e.g., an offshore platform system). A BOP assembly 16 is mounted to a wellhead 18, which is coupled to a mineral deposit 25 via a wellbore 26. The wellhead 18 may include any of a variety of other components such as a spool, a hanger, and a "Christmas" tree. The wellhead 18 may return drilling fluid or mud to the surface 12 during drilling operations, for example. Downhole operations are carried out by a tubular string 24 (e.g., drill string, production tubing string, or the like) that extends, through the BOP assembly 16, through the wellhead 18, and into the wellbore 26.

To facilitate discussion, the BOP assembly 16 and its components may be described with reference to an axial axis or direction 30, a radial axis or direction 32, and a circumferential axis or direction 34. The BOP assembly 16 may include one or more annular BOPs 42. A central bore 44 (e.g., flow bore) extends through the one or more annular BOPs 42. As discussed in more detail below, each of the annular BOPs 42 includes a packer (e.g., annular packer) that is configured to be mechanically squeezed radially inward to seal about the tubular string 24 extending through the central bore 44 (e.g., to block an annulus about the tubular string 24) or to block flow through the central bore 44. Certain disclosed embodiments include annular BOPs 42 having various features, such as a relatively large packer (e.g., having a larger thickness) surrounded by a relatively small donut (e.g., having a smaller thickness) and/or a one-piece assembly having a packer configured for use without a donut, that enable the annular BOPs 42 to maintain a closed position in which the packer seals about the tubular string 24 or blocks flow through the central bore 44.

Figure 2:
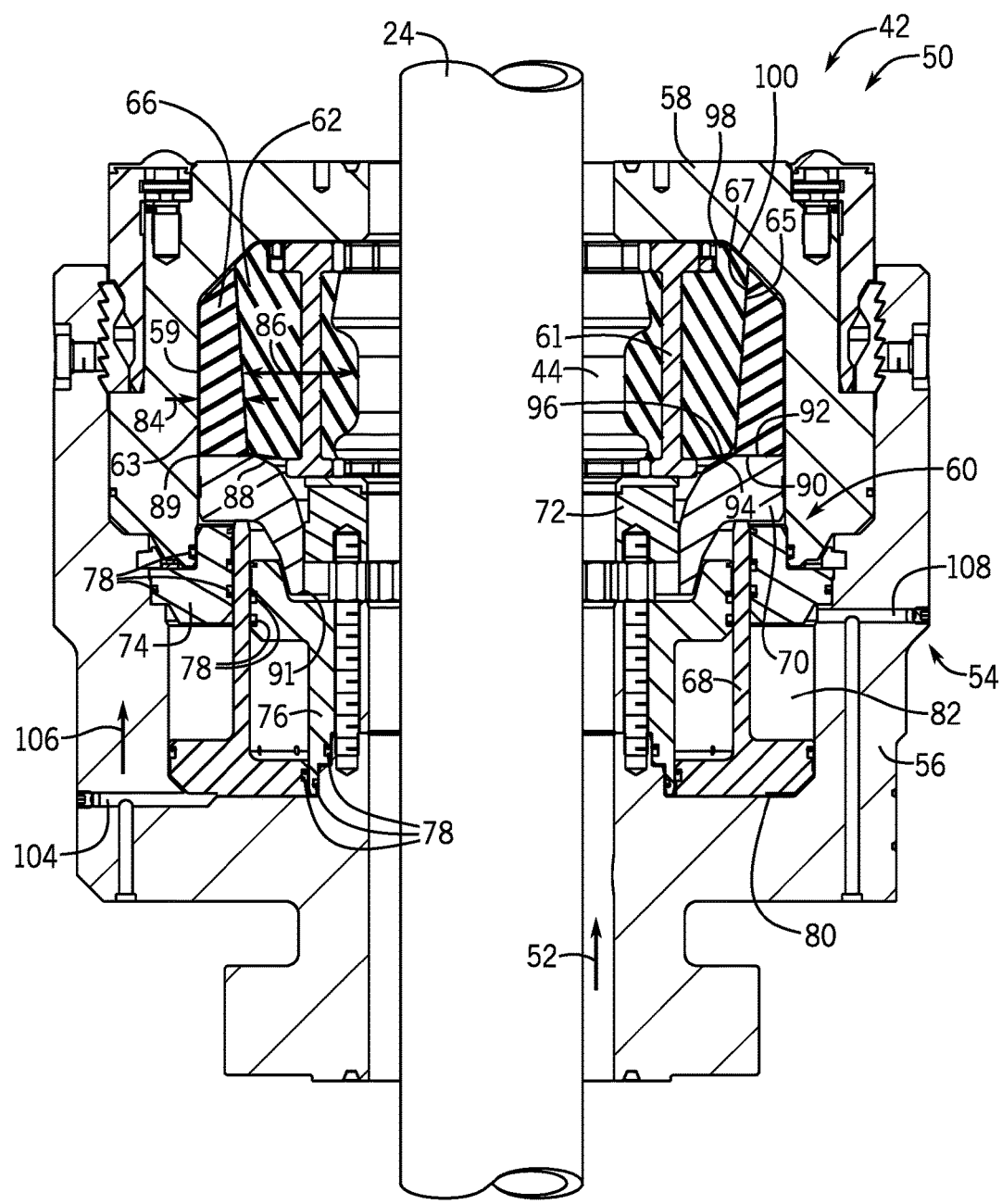
FIG. 2 is a cross-sectional side view of an embodiment of an annular BOP that may be used in the system of FIG. 1, wherein the annular BOP is in an open position.

FIG. 2 is a cross-sectional side view of the annular BOP 42 that may be used in the system 10 of FIG. 1. In the illustrated embodiment, the annular BOP 42 is in an open position 50. In the open position 50, fluid may flow through the central bore 44 of the annular BOP 42, as shown by arrow 52. The annular BOP 42 includes a housing 54 (e.g., annular housing) having a body 56 (e.g., annular body) and a top 58 (e.g., annular top portion or top component) coupled to the body 56. A piston assembly 60 (e.g., annular piston assembly), a packer 62 (e.g., annular packer), and a donut 66 (e.g., annular support structure) are positioned within the housing 54. The packer 62 and the donut 66 are flexible components (e.g., elastomer, such one or more of nitrile rubber [NBR], hydrogenated nitrile butadiene rubber [HNBR], carboxylated nitrile butadiene rubber [XNBR], carboxylated hydrogenated nitrile butadiene rubber [XH-NBR], fluoroelastomers [FKM], perfluoro-elastomers [FFKM], natural rubber [NR], butadiene rubber [BR], isoprene rubber [IR], styrene-butadiene rubber [SBR], polyurethane rubber [PU], polychloromethloxiran and copolymer [CO and ECO], polyacrylates rubber [ACM], chloroprene rubber [CR], isobutene-isoprene rubber [IIR], bromo-isobutene-isoprene rubber [BIIR], chloro-isobutene-isoprene rubber [CIIR], Terpolymer of ethylene, propylene and a diene rubber [EPDM], Ethylene-propylene copolymer rubber [EPR], any other type of polyolefin elastomers, or any type of elastomer or material having a hardness between approximately 60 to 85 durometer Shore A). The packer 62 and the donut 66 may be formed from the same or different materials from one another. In some embodiments, the packer 62 and/or the donut 66 may include various reinforcing materials, such as fibers, clay, graphene, carbon nanotubes, nanofibers, or the like, and the various reinforcing materials may include short fibers, long fibers, a fiber web, a fiber mesh, or the like to facilitate mechanical performance of the elastomer.

Rigid inserts 61 (e.g., metal or metal-alloy inserts or reinforcing inserts) extend axially through the packer 62 and are positioned at discrete circumferential locations about the packer 62. In some embodiments, and as discussed in more detail below, the inserts 61 may be arranged in a configuration that facilitates an "iris-style closing" (e.g., radially inward rotation) similar to that of an iris shutter of a camera that acts to prevent extrusion of the flexible material of the packer 62. As shown, the piston assembly 60 includes a piston 68 (e.g., annular piston) and a push plate 70 (e.g., annular push plate). Various support rings and adapters may be provided within the housing 54. For example, in the illustrated embodiment, a support ring 72 (e.g., annular support ring) supports the packer 62, an outer adapter 74 (e.g., annular outer adapter) is positioned circumferentially about the piston 68 and between the body 56 and the top 58, and an inner adapter 76 (e.g., annular inner adapter) is positioned radially-inwardly of the piston 68. Various seals 78 (e.g., o-rings or annular seals) may be provided in the body 56, the top 58, the piston 68, and/or the adapters 74, 76 to seal gaps 80, 82 (e.g., annular gaps) from the central bore 44 and from one another.

As shown, the donut 66 circumferentially surrounds the packer 62. In particular, a radially-outer surface 59 (e.g. annular surface) of the donut 66 contacts a radially-inner surface 63 (e.g., annular surface) of the top 58, and a radially-inner surface 65 (e.g., annular surface) of the donut 66 contacts a radially-outer surface 67 (e.g., annular surface) of the packer 62. As shown, a donut thickness 84 (e.g., a maximum thickness in the radial direction 32) of the donut 66 is less than a packer thickness 86 (e.g., a maximum packer thickness in the radial direction 32) of the packer 62 while the annular BOP 42 is in the open position 50. In certain embodiments, the donut thickness 84 is less than or equal to approximately 80, 70, 60, 50, 40, 30, 20, or 10 percent of the packer thickness 86 while the annular BOP 42 is in the open position 50. In certain embodiments, the donut thickness 84 is between approximately 10 to 80, 20 to 70, 30 to 60, or 40 to 50 percent of the packer thickness 86 while the annular BOP 42 is in the open position 50. As shown, a portion 98 (e.g., annular portion or upper annular portion) of the packer 62 contacts the top 58 of the housing 54 while the annular BOP 42 is in the open position 50. In certain embodiments, the portion 98 contacts an inner surface 100 (e.g., radially-inner annular surface, tapered annular surface, or conical surface) of the top 58 and/or the portion 98 is positioned in a space or gap (e.g., annular space or gap) defined between the top 58 and respective top plates 102 (e.g., anti-extrusion plate) of the inserts 61 along the radial axis 32.

In the illustrated embodiment, the push plate 70 directly contacts both the packer 62 and the donut 66 while the annular BOP 42 is in the open position 50. It should be understood that in certain embodiments, the push plate 70 may not directly contact both the packer 62 and the donut 66 while the annular BOP 42 is in the open position 50, but the push plate 70 may be aligned and positioned axially under the packer 62 and the donut 66 to directly contact both the packer 62 and the donut 66 as the annular BOP 42 moves from the open position 50 to the closed position. Thus, in operation, the push plate 70 may directly contact and apply respective compressive forces directly on both the packer 62 and the donut 66 (e.g., simultaneously or at the same time) as the annular BOP 42 moves from the open position 50 to the closed position (i.e., closing stroke). As shown, the push plate 70 includes a contacting surface 88 (e.g., annular surface or upper annular surface) that extends from a radially-outer edge 89 (e.g., annular) to a radially-inner edge 91 (e.g., annular) and that is configured to contact the packer 62 and the donut 66 during operation of the annular BOP 42. In particular, in the open position 50 or upon initial contact during the closing stroke, a first portion 90 (e.g., including an axially-facing annular surface) of the contacting surface 88 of the push plate 70 contacts a donut contacting surface 92 (e.g., axially-facing annular surface) of the donut 66, and a second portion 94 (e.g., including a curved and/or tapered annular surface or conical surface) of the contacting surface 88 of the push plate 70 contacts a packer contacting surface 96 (e.g., curved annular surface, tapered annular surface, conical surface) of the packer 62.

In certain embodiments, at least 5, 10, 15, 20, 25, 30, 35, 40, or 50 percent of the packer contacting surface 96 (e.g., percent of a surface area of the packer contacting surface) directly contacts the contacting surface 88 of the push plate 70 when the annular BOP 42 is in the open position 50 or during the initial contact between the packer 62 and the push plate 70 during the closing stroke. In certain embodiments, between approximately 5 to 50, 10 to 40, or 15 to 30 percent of the packer contacting surface 96 directly contacts the contacting surface 88 of the push plate 70 when the annular BOP 42 is in the open position 50 or during the initial contact between the packer 62 and the push plate 70 during the closing stroke. In certain embodiments, the packer contacting surface 96 contacts the contacting surface 88 of the push place 70 over at least approximately 5, 10, 15, 20, 25, 30, 35, 40, or 50 percent of the packer thickness 86 in the radial direction 32 when the annular BOP 42 is in the open position 50 or during the initial contact between the packer 62 and the push plate 70 during the closing stroke. In certain embodiments, the packer contacting surface 96 contacts the contacting surface 88 of the push plate 70 over at least approximately 5 to 50, 10 to 40, or 15 to 30 percent of the packer thickness 86 in the radial direction 32 when the annular BOP 42 is in the open position 50 or during the initial contact between the packer 62 and the push plate 70 during the closing stroke.

In certain embodiments, a surface area (e.g., annular contact area) of the first portion 92 of the push plate 70 that contacts the donut 66 is less than (e.g., 5, 10, 15, 20, 25, or 30 percent less or between approximately 5 to 30, 10 to 25, or 15 to 20 percent less) or approximately equal to a surface area (e.g., annular contact area) of the second portion 96 of the push plate 70 that contacts the packer 62 when the annular BOP 42 is in the open position 50 or upon initial contact during the closing stroke. In certain embodiments, at least approximately 5, 10, 15, 20, 25, 30, 35, 40, 45, or 50 percent of the contacting surface 88 of the push plate 70 contacts the packer 62, and at least approximately 5, 10, 15, 20, 25, 30, 35, 40, 45, or 50 percent of the contacting surface 88 of the push plate 70 contacts the donut 66 while the annular BOP 42 is in the open position 50 or upon initial contact during the closing stroke. In certain embodiments, approximately 5 to 50, 10 to 40, or 15 to 30 percent of the contacting surface 88 of the push plate 70 contacts the packer 62 and/or approximately 5 to 50, 10 to 40, or 15 to 30 percent of the contacting surface 88 of the push plate 70 contacts the donut 66 while the annular BOP 42 is in the open position 50 or upon initial contact during the closing stroke. In some embodiments, a compression force applied by the push plate 70 on the packer 62 during the closing stroke and/or when the annular BOP 42 is in the closed position is greater than or equal to approximately 10, 20, 30, 40, or 50 percent of a total compression force applied by the push plate 70 on the packer 62 and the donut 66, or the compression force applied by the push plate 70 on the packer 62 is between approximately 5 to 60, 10 to 50, or 20 to 40 percent of the total compression force.

As discussed in more detail below, the piston assembly 60 is configured to move relative to the housing 54 in the axial direction 30. For example, a fluid (e.g., a liquid or gas) may be provided to the gap 80 via one or more first fluid conduits 104 to drive the piston assembly 60 upward in the axial direction 30, as shown by arrow 106. As the piston assembly 60 moves upward, the push plate 70 applies respective compressive forces on the packer 62 and the donut 66, thereby driving the packer 62 and the donut 66 upward. When driven upward by the push plate 70, the packer 62 may move upward and inward within the top 58 to a closed position in which the packer 62 seals around the tubular string 24 extending through the central bore 44 or closes off the central bore 44. A second fluid conduit 108 is configured to provide a fluid (e.g., a liquid and/or gas) to the gap 82 to drive the piston assembly 60 downward, thereby causing the packer 62 to move into the open position 50.

Figure 3:
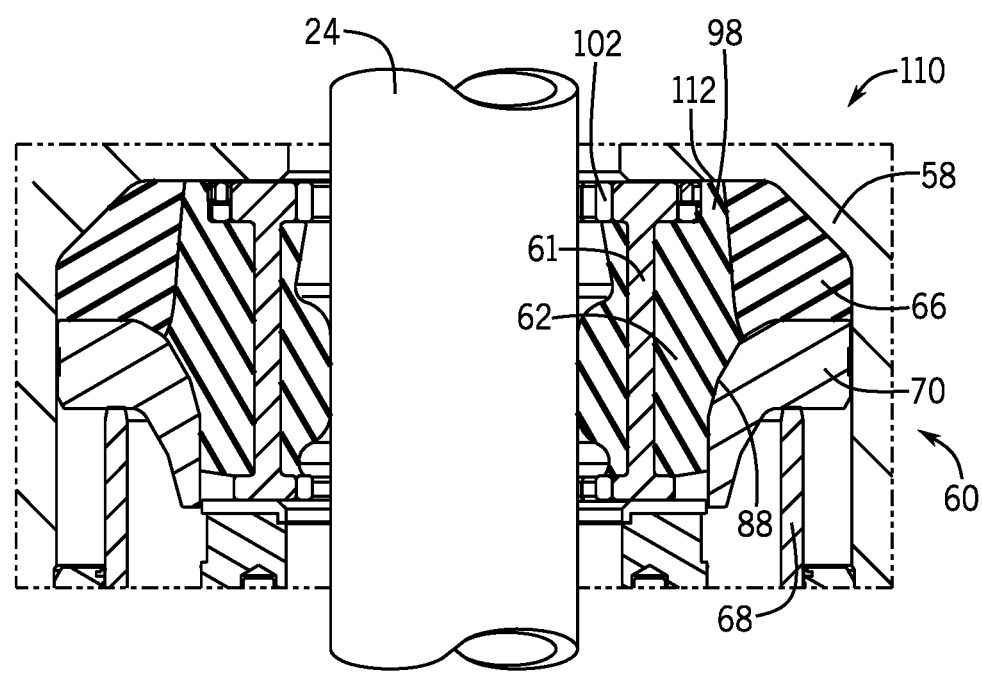
FIG. 3 is a cross-sectional side view of a portion of the annular BOP of FIG. 2, wherein the annular BOP is in a closed position.

FIG. 3 is a cross-sectional side view of an embodiment of the annular BOP 42 in a closed position 110. In the closed position 110, the packer 62 seals about the tubular string 24 extending through the central bore 44 or closes the central bore 44, thereby blocking fluid from flowing through the central bore 44 and above the packer 62. As discussed above, the piston assembly 60 moves in the axial direction 30 upon application of fluid from the fluid conduit 104, thereby driving the packer 62 in the axial direction 30. As the packer 62 moves in the axial direction 30, the push plate 70 and the top 58 squeeze the flexible material of the packer 62 and the donut 66 inward and upward to seal about the tubular string 24 or to close the central bore 44.

As the annular BOP 42 moves from the open position 50 to the closed position 110, the surface area of the contacting surface 88 of the push plate 70 that contacts the packer 62 and/or the surface area of the contacting surface 88 of the push plate that contacts the donut 66 increases. In some embodiments, at least 5, 10, 15, 20, 25, 30, 40, 50, 60, 70, 80, or 90 percent of the surface area of the contacting surface 88 contacts the packer 62 when the annular BOP 42 is in the closed position 110. In some embodiments, approximately 5 to 90, 10 to 80, 15 to 70, 20 to 60, or 30 to 50 percent of the surface area of the contacting surface 88 contacts the packer 62 when the annular BOP 42 is the closed position 110. As shown, the portion 98 of the packer 62 contacts an axially-facing surface 112 (e.g., annular surface) of the top 58 and/or the portion 98 is positioned between the donut 66 and respective top plates 102 of the inserts 61 along the radial axis 32 when the annular BOP 42 is in the closed position 110.

The features described with respect to FIGS. 2 and 3 may enable the push plate 70 of the piston assembly 60 to simultaneously drive the packer 62 and the donut 66 to seal the central bore 44. It should be understood that in some embodiments, the geometry of the push plate 70 may be modified to enable the push plate 70 to simultaneously drive the packer 62 and the donut 66 in accordance with the embodiments disclosed herein. The features may improve crack resistance of the packer 62 and/or the donut 66, enable the packer 62 to achieve the closed position 110 and/or maintain the seal with a lower pressure applied to the piston assembly 60 (e.g., within the space 80), and/or enable the tubular string 24 to drift (e.g., radially and/or axially) within the central bore 44 of the annular BOP 42, for example.

In some embodiments, the assembly (e.g., the closing assembly) may include the packer 62 having a modified geometry that enables the packer to seal the central bore 44 without use of the donut 66 or without any flexible or elastomeric structure circumferentially surrounding the packer 62. Thus, the assembly and the annular BOP 42 may be devoid of the donut 66 or devoid of any flexible or elastomeric structure circumferentially surrounding the packer 62. In such cases, the push plate 70 may contact and drive the packer 62 from the open position 50 to the closed position 110 to seal the central bore 44.

Figure 4:
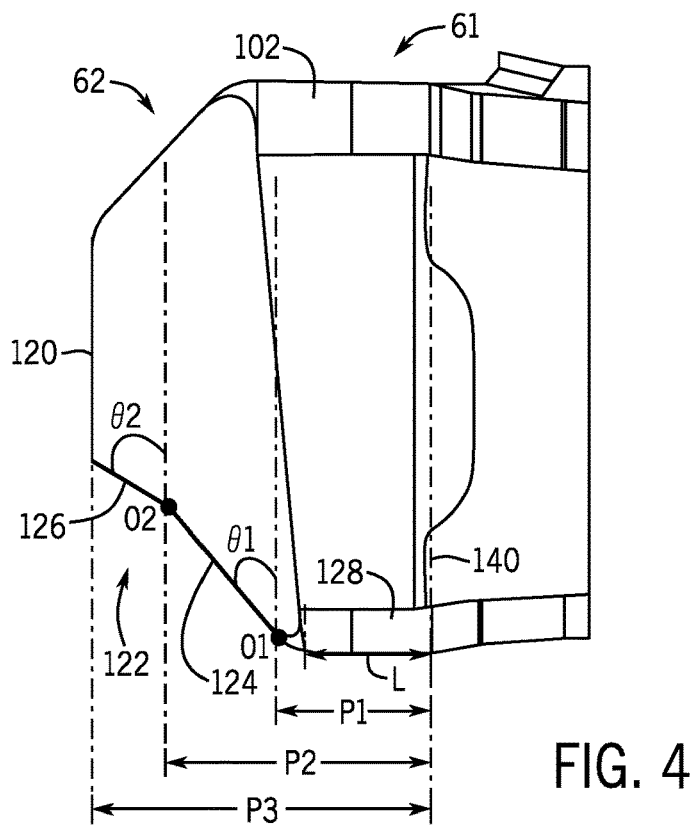
FIG. 4 is a cross-sectional side view of an embodiment of a packer having a modified geometry that enables the packer to seal a central bore of an annular BOP that may be used in the system of FIG. 1.

With the foregoing in mind, FIG. 4 is a cross-sectional side view of an embodiment of a portion of the packer 62 that includes the modified geometry that enables the packer to seal the central bore 44 without use of the donut 66 or without any flexible or elastomeric structure circumferentially surrounding the packer 62. In the illustrated embodiment, the packer 62 includes a radially-outer wall 120 (e.g., axially-extending annular wall or outer-most annular wall) that is configured to contact the housing 54 of the annular BOP 42 when the packer 62 is positioned within the housing 54 of the annular BOP 42 (e.g., when the annular BOP 42 is in the open position 50). In certain embodiments, no donut 66 or other flexible or elastomeric structure contacts the radially-outer wall 120 of the packer 62 when the packer 62 is installed within the housing 54 of the annular BOP 42 and/or during operation of the annular BOP 42.

In the illustrated embodiment, the packer 62 includes a push plate contacting surface 122 (e.g., tapered annular surface or conical surface) that is configured to contact the push plate 70 while the annular BOP is in the open position 50 or during the initial contact during the closing stroke. In the illustrated embodiment, the push plate contacting surface 122 includes a first portion 124 (e.g., tapered annular surface or conical surface) and a second portion 126 (e.g., tapered annular surface or conical surface). As shown in FIG. 4, the rigid inserts 61 are positioned circumferentially about the packer 62. Each insert 61 extends axially through the packer 62, and each insert 61 includes the top plate 102 and a bottom plate 128 (e.g., anti-extrusion plate).

Figure 5:
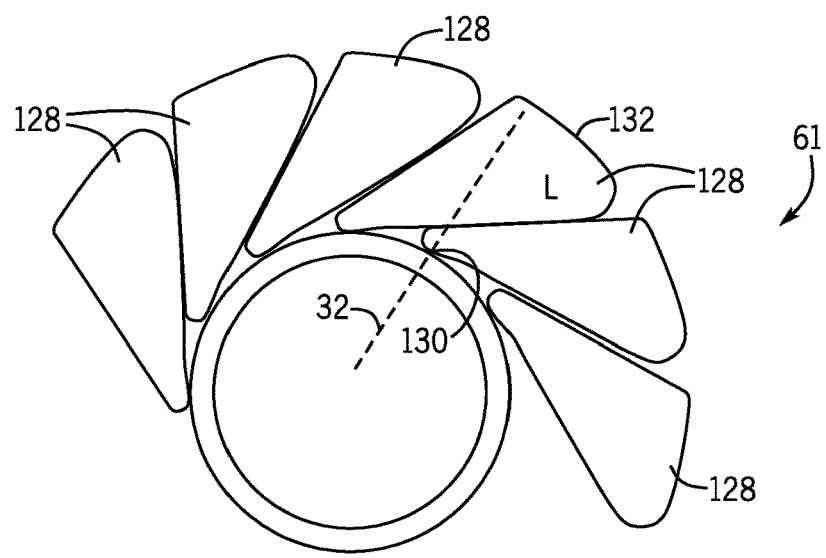
FIG. 5 is a top view of rigid inserts that may be utilized in the packer of FIG. 4.

The geometry of the push plate contacting surface 122 of the packer 62 may facilitate closing, as well as reduce strain and crack formation on the packer 62 during operation of the annular BOP 42, for example. In the illustrated embodiment, an insert thickness, L, may be measured in the radial direction 32 across the bottom plates 128 of the inserts 61 when the packer 62 of the annular BOP 42 is in the open position 50. The insert thickness, L, may also be visualized in FIG. 5, which is a top view of multiple inserts 61 positioned in a circumferential arrangement within the packer 62. While only six inserts 61 are shown to facilitate discussion and for image clarity, it should be understood that the inserts 61 may be arranged about the circumferentially about the entire packer 62 to form a generally annular ring of inserts 61. As shown, the radial thickness, L, extends in the radial direction 32 from a radially-inner edge 130 of the inserts 61 to a radially-outer edge 132 of the inserts 61. Due to the arrangement of the multiple inserts 61, the radially-inner edge 130 may be part of one insert 61, and the radially-outer edge 132 may be part of another insert 61, as shown. The inserts 61 shown in FIG. 5 may be utilized with any of the packers 62 disclosed herein.

Returning to FIG. 4, a first point, O1, (e.g., a first ring) may be defined at a radially-inner point of contact between the push plate contacting surface 122 of the packer 62 and the push plate 70 (e.g., an inner-most point or ring of contact between an elastomer material of the packer 62 and the push-plate 70). The first point, O1, may be located at a position that is axially-above or axially-below the bottom plates 128 of the inserts 61 (e.g., along the axial axis 30). The first portion 124 of the push plate contacting surface 122 of the packer 62 may extend or be oriented at a first angle, θ1, relative to the axial axis 30, as shown. A second point, O2, (e.g., a second ring) may be defined along the push plate contacting surface 122 between the first portion 124 and the second portion 126. As shown, the second portion 126 of the push plate contacting surface 122 of the packer 62 may extend or be oriented at a second angle, θ2, relative to the axial axis 30. The first portion 124 of the push plate contacting surface 122 may extend between the first point, O1, and the second point, O2, and the second portion 126 of the push plate contacting surface 122 may extend between the second point, O2, and the radially-outer surface 130.

A total thickness of the packer 62, P3, (e.g., in the radial direction 32) extends from the radially-outer wall 120 to a radially-inner wall 140 (e.g., axially-extending annular wall or inner-most wall) of the packer 62 that defines the center bore 44 through the packer 62 when the annular BOP 42 is in the open position 50. A first thickness, P1, (e.g., in the radial direction 32) extends from the radially-inner wall 140 to the location of the initial point, O1. A second thickness, P2, (e.g., in the radial direction 32) extends from the radially-inner wall 140 to the location of the second point, O2.

In certain embodiments, the first thickness, P1, is approximately equal to or greater than the insert thickness, L (e.g., P1 is approximately equal to or greater than 100, 125, 150, 175, 200, 225, or 250 percent of L and/or P1 is between approximately 100 to 250, 100 to 200, 100 to 150, 100 to 125, 125 to 150, 125 to 175, or 125 to 200 percent of L). Additionally or alternatively, in certain embodiments, the second thickness, P2, is greater than the first thickness, P1 (e.g., P2 is equal to or greater than 105, 110, 120, 130, 140, 150, or 160 percent of P1 and/or P2 is between approximately 105 to 175, 110 to 150, or 120 to 140 percent of P1). Additionally or alternatively, in certain embodiments, the total thickness, P3, is approximately equal to or greater than the second thickness, P2, and/or the first thickness, P1 (e.g., P3 is approximately equal to or greater than 100, 125, 150, 175, 200, 225, or 250 percent of P2 and/or P1 and/or P3 is between approximately 100 to 250, 100 to 200, 100 to 150, 100 to 125, 125 to 150, 125 to 175, or 125 to 200 percent of P2 and/or P1. Additionally or alternatively, as shown in FIG. 4, the second angle, θ2, may be greater than the first angle, θ1 (e.g., θ2 may be approximately 105, 125, 150, 175, or 200 percent of θ1 and/or θ2 may be between approximately 105 to 175, 110 to 150, or 120 to 140 percent of θ1). Additionally or alternatively, in certain embodiments, the first angle, θ1, is between approximately 0 to 90, 0 to 80, 0 to 50, 10 to 50, or 15 to 45 degrees. Additionally or alternatively, in certain embodiments, the second angle, θ2, is between approximately 0 to 90, 0 to 80, 20 to 80, or 40 to 60 degrees.

Figure 6:
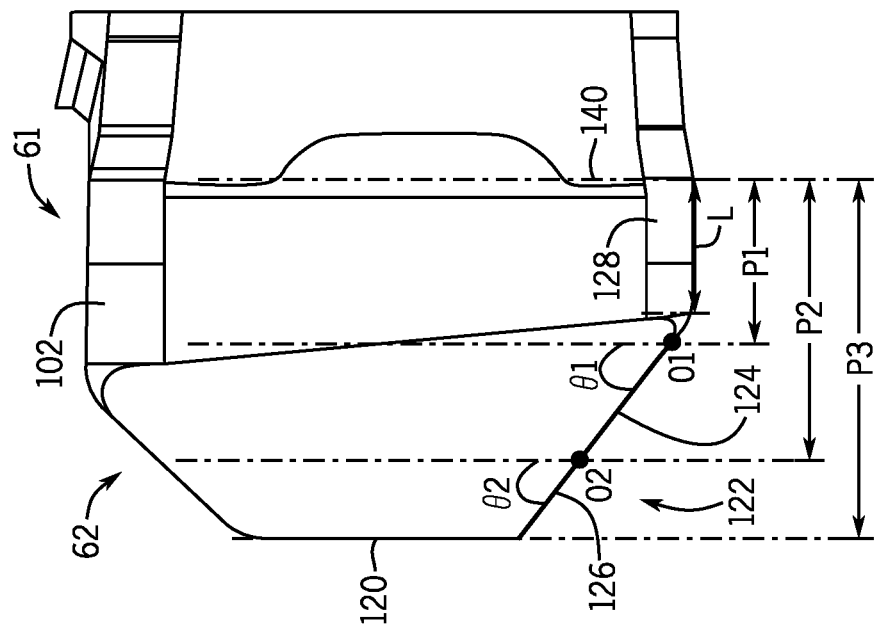
FIG. 6 is a cross-sectional side view of an embodiment of the packer having a modified geometry.
Figure 7:
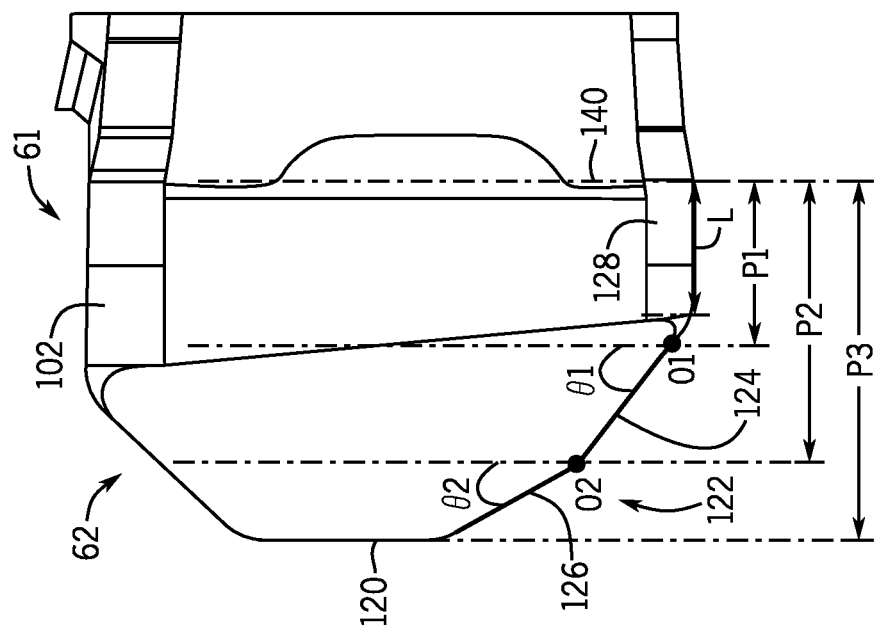
FIG. 7 is a cross-sectional side view of an embodiment of the packer having a modified geometry.

FIGS. 6 and 7 are cross-sectional side views of embodiments of a portion of the packer 62 that includes the modified geometry that enables the packer to seal the central bore 44 without use of the donut 66 or without any flexible or elastomeric structure circumferentially surrounding the packer 62. In FIG. 6, the first angle, θ1, is greater than the second angle, θ2 (e.g., θ1 may be approximately 105, 125, 150, 175, or 200 percent of θ2 and/or θ1 may be between approximately 105 to 175, 110 to 150, or 120 to 140 percent of θ2). In FIG. 7, the first angle, θ1, is approximately equal to the second angle, θ2.

Figure 8:
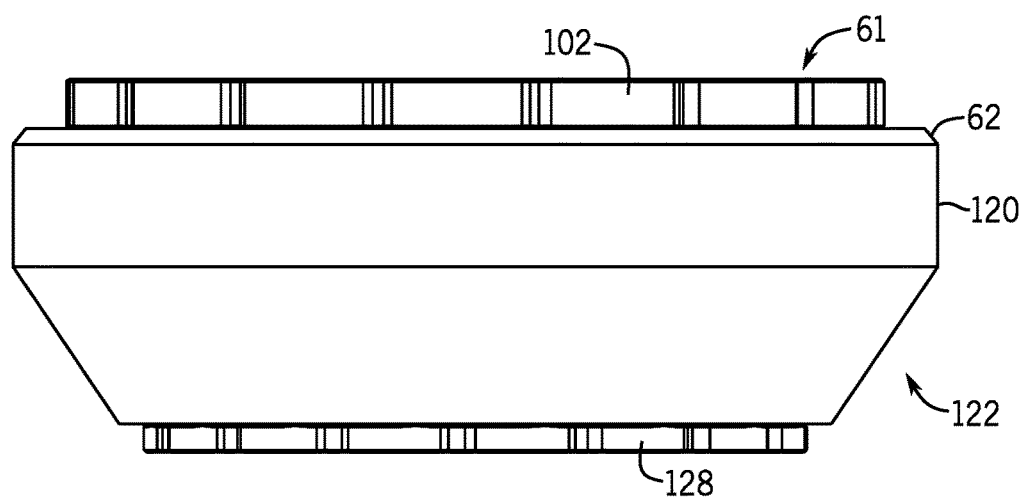
FIG. 8 is a side view of an embodiment of the packer having a modified geometry.

FIG. 8 is a side view of an embodiment of the packer 62. In the illustrated embodiment, the first thickness, P1, is approximately 130 percent of the insert thickness, L; the total thickness, P3, is approximately 188 percent of the first thickness, P1; and the first angle, θ1, is approximately 30 degrees and approximately equal to the second angle, θ2. As noted above, the packer 62 may include any of a variety of features and geometries in any suitable combination to enable the packer 62 to seal the central bore 44.

Figure 9:
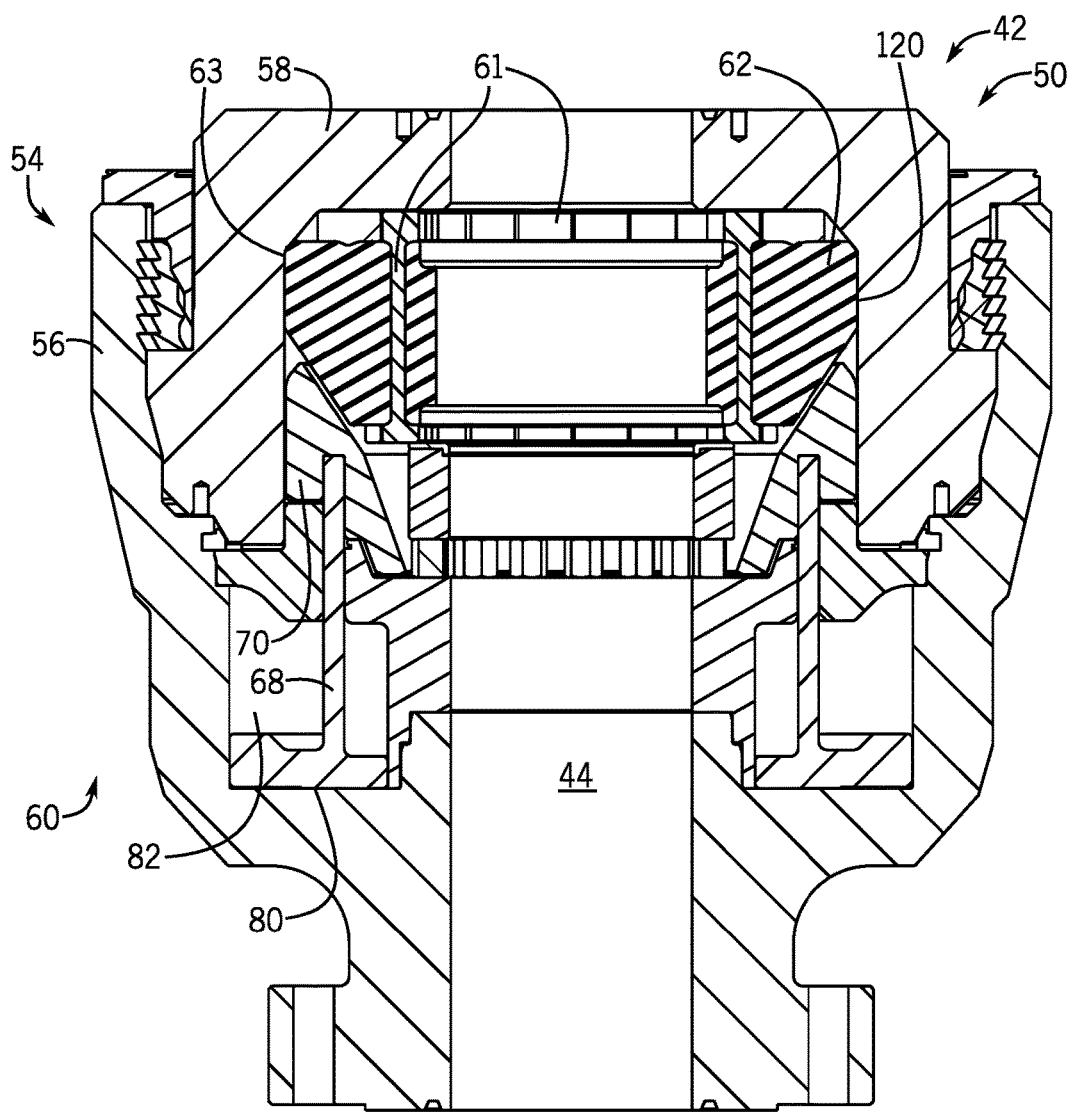
FIG. 9 is a cross-sectional side view of an embodiment of an annular BOP that may be used in the system of FIG. 1, wherein the annular BOP includes the packer having a modified geometry.

FIG. 9 is a cross-sectional side view of the annular BOP 42 having the packer 62 with the modified geometry described above with respect to FIG. 7. However, it should be understood that the packer 62 may have the modified geometry or any features described above with respect to FIGS. 4-8, for example. As shown, the annular BOP 42 does not include any flexible or elastomeric structure (e.g., the donut 66) circumferentially surrounding the packer 62. Instead, the radially-outer surface 120 of the packer 62 directly contacts the housing 54 (e.g., the radially-inner surface 63 of the top 58) while the annular BOP 42 is in the open position 50.

In operation, a fluid (e.g., a liquid or gas) may be provided to the gap 80 to drive the piston assembly 60 upward in the axial direction 30. As the piston assembly 60 moves upward, the push plate 70 contacts the push plate contacting surface 122 of the packer 62 and applies a compressive force on the packer 62, thereby driving the packer 62 upward. When driven upward by the push plate 70, the packer 62 may move upward and inward within the top 58 to a closed position in which the packer 62 seals around the tubular string 24 extending through the central bore 44 or closes off the central bore 44. As discussed above, a fluid (e.g., a liquid and/or gas) may be provided to the gap 82 to drive the piston assembly 60 downward, thereby causing the packer 62 to move into the open position 50. The push plate 70 may include a corresponding shape or geometry to enable the push plate 70 to contact the push plate contacting surface 122 of the packer 62. In some embodiments, the push plate 70 may be configured to generate a lowest internal stress of the packer 62, as determined via finite element analysis, for example.

FIG. 10 is a perspective view of one insert 61, and FIG. 11 is a side view of one insert 61. As shown, the insert 61 includes the top plate 102, the bottom plate 128, and an axially-extending portion 150 that extends between the top plate 102 and the bottom plate 128. When assembled together, the axially-extending portion 150 may extend through the packer 62 and be surrounded by the packer 62. FIG. 12 is a top view of a packer assembly having multiple inserts 61 positioned in a circumferential arrangement about the packer 62. In operation, the inserts 61 may be arranged in a configuration that facilitates an "iris-style closing" (e.g., radially inward rotation) similar to that of an iris shutter of a camera that acts to prevent extrusion of the flexible material of the packer 62. For example, a first surface 152 (e.g., an axially-extending surface) of one insert 61 may slide along a second surface 154 (e.g., an axially-extending surface) of an adjacent insert 61, as shown by arrow 156, as the packer 62 is compressed and as the annular BOP 42 moves from the open position 50 to the closed position 110. The features of the packer 62 and other components of the annular BOP 42 may facilitate closing, enable the tubular string 24 to drift (e.g., radially and/or axially) within the central bore 44 of the annular BOP 42, reduce the weight of the annular BOP 42, as well as provide simplified manufacturing, installation, removal, repair, and/or replacement of the packer assembly within the annular BOP 42, for example.

While the disclosure may be susceptible to various modifications and alternative forms, specific embodiments have been shown by way of example in the drawings and have been described in detail herein. However, it should be understood that the invention is not intended to be limited to the particular forms disclosed. Rather, the disclosure is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An annular blowout preventer, comprising:
a housing;
an annular packer positioned within the housing;
an annular piston positioned within the housing, wherein an annular contacting surface of the annular piston is configured to contact the annular packer while the annular blowout preventer is in an open position; and
a plurality of inserts extending axially through the annular packer and arranged circumferentially within the annular packer, wherein the annular piston is configured to drive the annular packer in an axial direction within the housing, thereby compressing the annular packer, causing the plurality of inserts to each rotate about a respective axis in the axial direction of the annular blowout preventer as the plurality of inserts are directed radially inwardly, and moving the annular blowout preventer from the open position to a closed position.

2. The annular blowout preventer of claim 1, comprising an annular donut positioned circumferentially about the annular packer within the housing, wherein the annular contacting surface of the annular piston is configured to simultaneously contact and drive the annular packer and the annular donut in the axial direction to move the annular blowout preventer from the open position to the closed position.

3. The annular blowout preventer of claim 2, wherein the annular packer and the annular donut each comprise a flexible material.

4. The annular blowout preventer of claim 2, wherein a first thickness of the annular packer is greater than a second thickness of the annular donut.

5. The annular blowout preventer of claim 1, wherein at least 5 percent of the annular contacting surface contacts the annular packer when the annular blowout preventer is in the open position.

6. The annular blowout preventer of claim 1, wherein a portion of the annular packer is positioned between respective top plates of the plurality of inserts and the housing along a radial axis when the annular blowout preventer is in the open position.

7. The annular blowout preventer of claim 1, wherein the annular contacting surface extends from a radially-outer edge of the annular piston to a radially-inner edge of the annular piston, and the annular contacting surface includes a curved portion that is configured to contact the annular packer while the annular blowout preventer is in the open position.

8. An annular blowout preventer, comprising:
a housing;
an annular piston positioned within the housing;
an annular packer positioned within the housing; and an annular donut positioned circumferentially about the annular packer within the housing, wherein a first thickness of the annular packer is greater than a second thickness of the annular donut, and the annular piston is configured to drive the annular packer and the annular donut against a radially-inwardly extending surface of the housing to move the annular blowout preventer from an open position to a closed position;

wherein an annular contacting surface of the annular piston is configured to simultaneously contact and drive the annular packer and the annular donut in an axial direction, and the annular packer and the annular donut are in contact with and are compressed between the annular contacting surface and the radially-inwardly extending surface of the housing as the annular blowout preventer moves from the open position to the closed position.

9. The annular blowout preventer of claim 8, wherein the annular packer and the annular donut each comprise a flexible material.

10. The annular blowout preventer of claim 8, wherein the second thickness is between 10 to 80 percent of the first thickness.

11. The annular blowout preventer of claim 8, wherein an annular contacting surface of the annular piston is positioned axially below the annular packer and the annular donut when the annular blowout preventer is in the open position to enable the annular contacting surface to contact both the annular packer and the annular donut as the annular blowout preventer moves from the open position to the closed position.

12. The annular blowout preventer of claim 8, wherein a radially-outer donut surface of the annular donut contacts an axially-extending surface of the housing, and a radially-inner donut surface of the annular donut extends along a radially-outermost packer surface of the annular packer while the annular blowout preventer is in the open position.

13. The annular blowout preventer of claim 8, wherein the radially-inwardly extending surface comprises an axially-facing surface.

14. An annular blowout preventer, comprising:
 a housing;
 an annular piston positioned within the housing;
 an annular packer positioned within the housing; and
 an annular donut positioned circumferentially about the annular packer within the housing, wherein a first thickness of the annular packer is greater than a second thickness of the annular donut, and the annular piston is configured to drive the annular packer and the annular donut against a radially-inwardly extending surface of the housing to move the annular blowout preventer from an open position to a closed position; and a plurality of rigid inserts positioned within the annular packer, wherein the plurality of rigid inserts are configured to rotate radially inwardly as the annular blowout preventer moves from the open position to the closed position.

15. An annular blowout preventer, comprising:
 a housing;
 an annular piston positioned within the housing;
 an annular packer positioned within the housing; and
 an annular donut positioned circumferentially about the annular packer within the housing, wherein an annular contacting surface of the annular piston is configured to simultaneously contact and drive the annular packer and the annular donut in an axial direction to move the annular blowout preventer from an open position to a closed position, and a first surface area of the annular contacting surface that contacts the annular donut when the annular blowout preventer is in the open position is less than a second surface area of the annular contacting surface that contacts the annular donut when the annular blowout preventer is in the closed position.

16. The annular blowout preventer of claim 15, wherein a third surface area of the annular contacting surface of the annular piston that contacts the annular packer while the annular blowout preventer is in the open position is less than the first surface area of the annular contacting surface of the annular piston that contacts the annular donut while the annular blowout preventer is in the open position.

17. The annular blowout preventer of claim 15, wherein the annular packer and the annular donut each comprise a flexible material.

18. The annular blowout preventer of claim 15, wherein a first thickness of the annular packer is greater than a second thickness of the annular donut.

19. The annular blowout preventer of claim 15, comprising a plurality of rigid inserts positioned within the annular packer, wherein the plurality of rigid inserts are configured to rotate radially inwardly as the annular blowout preventer moves from the open position to the closed position.

* * * * *